US012553758B2

(12) United States Patent
Allred et al.

(10) Patent No.: US 12,553,758 B2
(45) Date of Patent: Feb. 17, 2026

(54) FLUID QUANTITY SENSOR SYSTEMS

(71) Applicant: Simmonds Precision Products, Inc., Vergennes, VT (US)

(72) Inventors: Charles Jeff Allred, Shelburne, VT (US); Christopher Wilson, Wake Forest, NC (US)

(73) Assignee: Simmonds Precision Products, Inc., Vergennes, VT (US)

( * ) Notice: Subject to any disclaimer, the term of this patent is extended or adjusted under 35 U.S.C. 154(b) by 50 days.

(21) Appl. No.: 17/462,978

(22) Filed: Aug. 31, 2021

(65) Prior Publication Data

US 2022/0065680 A1 Mar. 3, 2022

Related U.S. Application Data

(60) Provisional application No. 63/072,449, filed on Aug. 31, 2020.

(51) Int. Cl.
*G01F 23/20* (2006.01)

(52) U.S. Cl.
CPC .................... *G01F 23/20* (2013.01)

(58) Field of Classification Search
CPC ........................................ G01F 23/20
USPC .................................... 73/296, 786
See application file for complete search history.

(56) References Cited

U.S. PATENT DOCUMENTS

| 4,739,494 | A | * | 4/1988 | Torii | G01G 5/06 |
| | | | | | 702/173 |
| 5,133,212 | A | * | 7/1992 | Grills | G01F 23/20 |
| | | | | | 177/136 |
| 5,207,099 | A | | 5/1993 | Baker | |

(Continued)

FOREIGN PATENT DOCUMENTS

| CN | 103776473 B | 1/2017 | |
| CN | 110208273 A | 9/2019 | |
| DE | 102018205336 A1 * | 10/2019 | ............. B60K 15/03 |

OTHER PUBLICATIONS

Figueroa et al, "Strain-Gauge Measurement of Weight of Fluid in a Tank", Mechanical & Fluid Systems;Mar. 1, 2004; article; Refer to SSC-00187. Original URL—/Briefs/Mar04/SSC00187.html.
Extended European search report issued in corresponding EP application No. 21194187.7, dated Jan. 26, 2022 (10 pages).

(Continued)

*Primary Examiner* — John Fitzgerald
(74) *Attorney, Agent, or Firm* — Kinney & Lange, P.A.

(57) ABSTRACT

A fluid quantity sensor system for sensing a fluid quantity in a fluid tank can include one or more strain sensors configured to be disposed in physical communication with the tank to sense a strain on one or more portions of the tank. The one or more strain sensors can include at least a first strain sensor disposed in physical communication with a first portion of the tank, and a second strain sensor disposed in physical communication with the second portion of the tank such that the first strain sensor is configured to sense a strain of the first portion of the tank and the second strain sensor is configured to sense a strain of the second portion of the tank. The first strain sensor and the second strain sensor can be positioned such that externally induced stress on a structure forming and/or supporting the tank can be cancelled out such that such that a strain caused by only the fluid in the tank can be determined to determine a weight of the fluid in the tank.

18 Claims, 3 Drawing Sheets

(56) References Cited

U.S. PATENT DOCUMENTS

| | | | |
|---|---|---|---|
| 6,615,656 B1* | 9/2003 | Breed | G01F 23/36 |
| | | | 177/136 |
| 6,703,635 B2 | 3/2004 | Yashiro et al. | |
| 6,928,881 B2* | 8/2005 | Brennan | G01M 5/0033 |
| | | | 73/766 |
| 9,694,674 B2 | 7/2017 | Dudar et al. | |
| 9,952,081 B2 | 4/2018 | Staudinger et al. | |
| 10,641,645 B2* | 5/2020 | Bellinger | G01G 17/04 |
| 10,648,846 B2 | 5/2020 | Carralero et al. | |
| 2015/0114103 A1 | 4/2015 | Marcos Montes et al. | |
| 2015/0268083 A1 | 9/2015 | Ogiwara et al. | |
| 2015/0346014 A1* | 12/2015 | Vander Putten | G01G 17/04 |
| | | | 73/296 |
| 2017/0199093 A1 | 7/2017 | Wang et al. | |
| 2019/0049280 A1* | 2/2019 | Carralero | G01F 23/18 |
| 2019/0094062 A1* | 3/2019 | Bellinger | G01D 21/02 |
| 2022/0065680 A1* | 3/2022 | Allred | G01G 3/14 |

OTHER PUBLICATIONS

Communication Pursuant to Article 94(3) EPC issued in corresponding EP Application No. 21194187.7, dated Jun. 28, 2023.

* cited by examiner

FLUID QUANTITY SENSOR SYSTEMS

CROSS-REFERENCE TO RELATED APPLICATIONS

This application claims priority to and the benefit of U.S. Provisional Application No. 63/072,449, filed Aug. 31, 2020, the entire contents of which are herein incorporated by reference in their entirety.

FIELD

This disclosure relates to fluid quantity sensor systems for tanks, e.g., aircraft fuel tanks.

BACKGROUND

The precise measurement of fuel quantity, used to estimate energy available for operation of the aircraft engines, is valuable for maximizing operational efficiency. The most widely used method utilizes capacitive sensors to measure the height (and thus quantity) of fuel in the tank, combined with a capacitive compensator to measure the variance in fuel dielectric, and a densitometer to measure fuel density. From these three measurements, the fuel mass and energy is estimated.

Another emerging method is a pressure based approach, where the fuel mass is estimated based on measurement of fuel pressure and density. This method utilizes optical sensors, which reduces the amount of electrical energy in the fuel tank as well as accomplishing a similar accuracy measurement as the traditional system, yet with less sensors. Sensor count reduction reduces installation cost and improves safety.

Such conventional methods and systems have generally been considered satisfactory for their intended purpose. However, there is still a need in the art for improved fluid quantity sensor systems. The present disclosure provides a solution for this need.

SUMMARY

In accordance with at least one aspect of this disclosure, a fluid quantity sensor system for sensing a fluid quantity in a fluid tank can include one or more strain sensors configured to be disposed in physical communication with the tank to sense a strain on one or more portions of the tank. The one or more strain sensors can include at least a first strain sensor disposed in physical communication with a first portion of the tank, and a second strain sensor disposed in physical communication with the second portion of the tank such that the first strain sensor is configured to sense a strain of the first portion of the tank and the second strain sensor is configured to sense a strain of the second portion of the tank. The first strain sensor and the second strain sensor can be positioned such that externally induced stress on a structure forming and/or supporting the tank can be cancelled out such that such that a strain caused by only the fluid in the tank can be determined to determine a weight of the fluid in the tank.

The system can include a weight module configured to be operatively connected to the one or more strain sensors and configured to determine a strain and/or a weight of a fluid in the tank based on received strain signals from the one or more strain sensors.

The weight module can include weight correlation data configured to correlate the strain with the weight of the fluid.

The one or more strain sensors can be integral with a structure forming and/or supporting the tank. The structure forming and/or supporting the tank can be a composite material formed in layers. The one or more strain sensors can be disposed between a plurality layers.

The one or more strain sensors can be one or more fiber Bragg grating (FBG) sensors. Any other suitable optical sensors configured to sense strain are contemplated herein.

In certain embodiments, the first strain sensor can be disposed in an opposite strain location of the second strain sensor. For example, the first portion of the tank can be a gravitational bottom of the tank, and a second portion of the tank can be a gravitational top of the tank.

The weight module can be configured to receive strain signals from the first strain sensor and the second strain sensor and to cancel out externally induced stress on a structure forming and/or supporting the tank such that a strain caused by only the fluid in the tank can be determined to determine a weight of the fluid in the tank. The weight module can include any suitable optical hardware, computer hardware and/or computer software module(s) configured to perform any suitable function disclosed herein (e.g., as described above), and/or any other suitable function as appreciated by those having ordinary skill in the art.

In accordance with at least one aspect of this disclosure, an aircraft wing tank system can include a fuel tank, and a fluid quantity sensor system for sensing a fuel quantity in the fuel tank. The fluid quantity measuring system can be any suitable system disclosed herein, e.g., as described above. The one or more strain sensors can be integral with a wing structure forming and/or supporting the tank. The wing structure forming and/or supporting the tank can be a composite material formed in layers, wherein the one or more strain sensors are disposed between a plurality layers.

In accordance with at least one aspect of this disclosure, a method of determining a weight of a fluid in a tank can include receiving a first optical signal from a first strain sensor disposed at a first location of the tank and receiving a second optical signal from a second strain sensor disposed at a second location of the tank. The method can include cancelling out externally induced strain on the tank using both the first and second strain signals and determining the weight of the fluid in the tank based on the a remaining strain on the tank determined from the first optical signal and/or the second optical signal. The method can include any other suitable method(s) and/or portion(s) thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
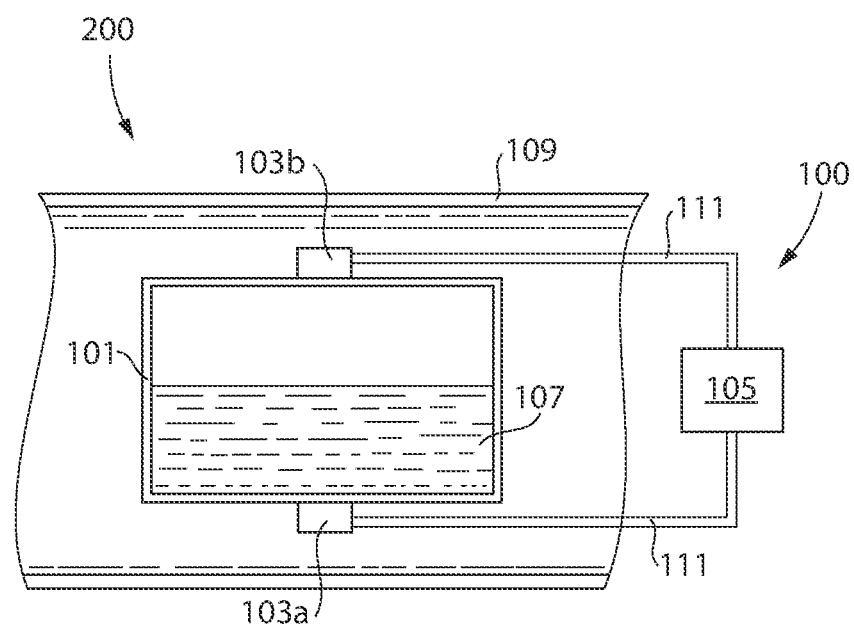
FIG. 1 is a schematic diagram of an embodiment of a system in accordance with this disclosure.
Figure 2:
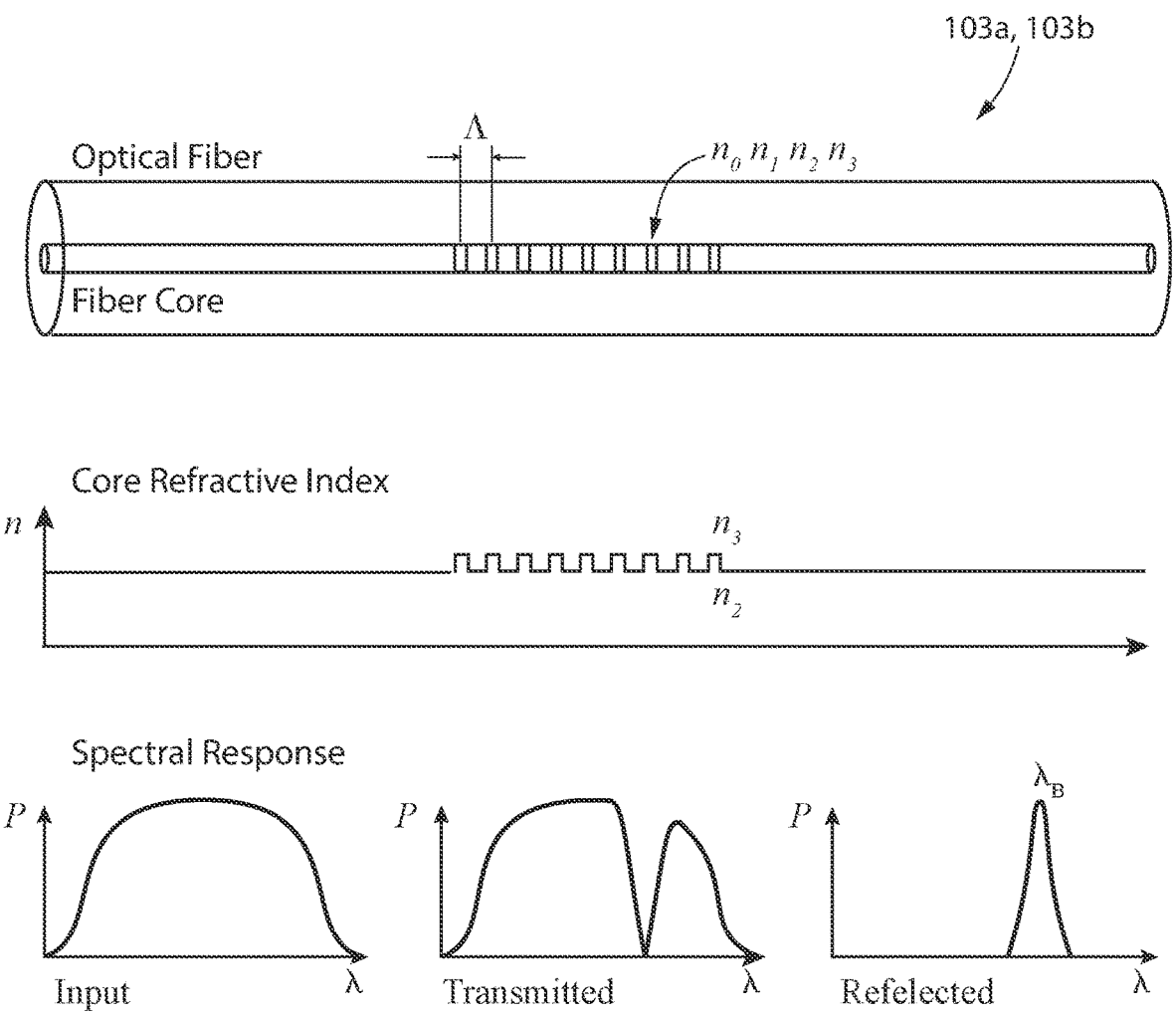
FIG. 2 is a schematic diagram of an embodiment of an optical strain sensor with a chart of core refractive index as well as spectral response.
Figure 3:
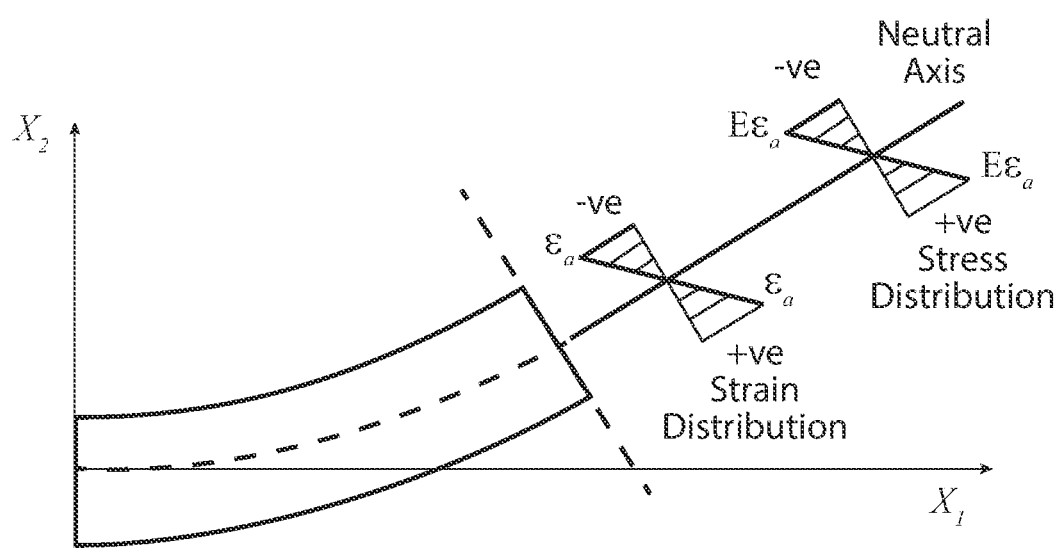
FIG. 3 is a schematic diagram of a portion of a fiber optic strain gauge under strain.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2 and 3.

In accordance with at least one aspect of this disclosure, referring to FIG. 1, a fluid quantity sensor system 100 for sensing a fluid quantity in a fluid tank 101 (e.g., fuel in a fuel tank) can include one or more strain sensors 103a, 103b configured to be disposed in physical communication with (e.g., directly or indirectly attached to) the tank 101 to sense a strain on one or more portions (e.g., a top, a bottom, one or more sides, etc.) of the tank 101. The system 100 can include a weight module 105 configured to be operatively connected to the one or more strain sensors 103a, b and configured to determine a strain and/or a weight of a fluid 107 in the tank 101 based on received strain signals from the one or more strain sensors 103a, b.

In certain embodiments, the weight module 105 can include an optical output (e.g., a laser) to interrogate the one or more strain sensors 103a, b (e.g., using a tuned swept laser method, or a broadband response method). The weight module 105 can include any suitable optical hardware.

The weight module 105 can include weight correlation data (e.g., a map or any other suitable table) configured to correlate the strain with the weight of the fluid 107. The one or more strain sensors 103a, b can be integral with a structure 109 forming and/or supporting the tank 101. The structure 109 forming and/or supporting the tank 101 can be a composite material formed in layers (e.g., a composite airframe). In certain embodiments, the one or more strain sensors 103a, b can be disposed between a plurality layers. Any suitable material for the tank (e.g., metal) is contemplated therein, and the one or more strain sensors can be integrated into the tank structure material in any suitable manner.

Referring additionally to FIGS. 2 and 3, the one or more strain sensors 103a, b can be one or more fiber Bragg grating (FBG) sensors, e.g., as shown. Any other suitable strain sensors (e.g., a Fabry Perot sensor, a foil type) configured to sense strain are contemplated herein.

The one or more strain sensors 103a, 103b can include a first strain sensor 103a disposed in physical communication with a first portion (e.g., a bottom) of the tank 101, and a second strain sensor 103b disposed in physical communication with the second portion (e.g., a top) of the tank 101 such that the first strain sensor 103a is configured to sense a strain of the first portion of the tank 101 and the second strain sensor 103b is configured to sense a strain of the second portion of the tank 101. The first strain sensor 103a and the second strain sensor 103b can be positioned such that externally induced stress on a structure (e.g., a wing, a strut) forming and/or supporting the tank can be cancelled out such that such that a strain caused by only the fluid in the tank can be determined to determine a weight of the fluid in the tank.

In certain embodiments, the first strain sensor 103a can be disposed in an opposite strain location of the second strain sensor 103b. For example, the first portion of the tank 103a can be a gravitational bottom of the tank 101, and a second portion of the tank can be a gravitational top of the tank 101. In certain embodiments, the sensors 103a, 103b can be disposed diametrically opposite from each other (e.g., in the same x-axis and y-axis position on a wing tank, and at different z-axis positions on the wing structure, e.g., as shown).

The weight module 105 can be configured to receive strain signals from the first strain sensor 103a and the second strain sensor 103b (e.g., via one or more optical cables 111). The weight module 105 can be configured to cancel out externally induced stress on a structure 109 (e.g., stress on a wing structure 109 in flight) forming and/or supporting the tank 101 such that a strain caused by only the fluid 107 in the tank 101 can be determined to determine a weight of the fluid 107 in the tank 101. The weight module 105 can include any suitable optical hardware, computer hardware and/or computer software module(s) configured to perform any suitable function(s) (and/or any combination thereof) disclosed herein (e.g., as described above), and/or any other suitable function as appreciated by those having ordinary skill in the art.

In accordance with at least one aspect of this disclosure, an aircraft wing tank system (e.g., system 200 as shown in FIG. 1) can include a fuel tank (e.g., tank 101), and a fluid quantity sensor system (e.g., system 100 as disclosed above) for sensing a fuel quantity in the fuel tank 101. The fluid quantity measuring system can be any suitable system disclosed herein, e.g., as described above. The one or more strain sensors can be integral with a wing structure forming and/or supporting the tank. The wing structure forming and/or supporting the tank can be a composite material formed in layers, wherein the one or more strain sensors are disposed between a plurality layers.

In accordance with at least one aspect of this disclosure, a method of determining a weight of a fluid in a tank can include receiving a first optical signal from a first strain sensor disposed at a first location of the tank and receiving a second optical signal from a second strain sensor disposed at a second location of the tank. The method can include cancelling out externally induced strain on the tank using both the first and second strain signals and determining the weight of the fluid in the tank based on the a remaining strain on the tank determined from the first optical signal and/or the second optical signal. The method can include any other suitable method(s) and/or portion(s) thereof.

Embodiments can use multiple sensors in any suitable position and any suitable strain cancelling methodology, for example. Embodiments can include multiple pairs of sensors, e.g., each in positions that can be correlated to relative strain. Certain embodiments can assume a structure acts as a cantilever, and can cancel out externally induced strain on both top and bottom and be left with only additional strain on the bottom of structure due to weight of fuel.

Embodiments can include an integrated fiber optic strain gauge integrated into a structure that forms tank (e.g., or any wall that forms tank, for example). An optical cable can come out of the structure, e.g., a wing at any desired location (e.g., a wing root). Embodiments can be employed in a wet wing/rigid tank structure, but may also be applicable to a bladder tank.

In certain embodiments, while a strain measurement correlates to a weight of fuel directly, each strain gauge itself or a stiffness of structure can have temperature dependency. As a result, certain embodiments can include a temperature correction module associated with the weight module for correcting for temperature if desired (e.g., using temperature correlation data and a temperature reading from a temperature sensor). Certain embodiments may accept temperature variance and utilize a simple chart correlating strain to weight without a temperature correction.

Embodiments include an alternative strain-based method, which would enable estimation of fuel energy without a need for pressure sensors inside of the tank. Instead, embodiments can utilize fiber bragg-grating strain sensors embedded in the composite structure of the wing to measure the fuel quantity, for example. As aircraft utilize more and more to composite structures, metal wiring and sensors in the wing fuel tanks represent a more challenging problem for lightning protection. Additionally, the installation of sensors into the aircraft fuel tanks can be a high cost aspect of aircraft build on the assembly line. Any methods that can remove sensors from the tank for both safety and cost reasons will have a distinct advantage in the industry.

Embodiments can measure the load in aircraft fuel tanks (or any other suitable fluid in any other suitable tank), by measuring the strain on the tank structure. Different fuel quantities impart different loads on the fuel tank (due to more or less weight). Embodiments can utilize traditional foil strain gages, or with fiber optic strain measurement techniques. Benefits of the fiber optic technique includes the ability to embed the fiber optic sensors into the tank structure, if it is composite, for example. To accommodate loads due to aircraft motion, sensors could be placed in/on the upper and lower surfaces of the tanks, and differential measurement of the sensor sets can eliminate extraneous load factors.

Strain sensing is the practice of measuring a structure's reaction to an applied load. It is a unit-less measurement, because the measure is displacement/length. For instance, if a weight is hung from the free end of a cantilevered beam, the strain along the top of the beam will increase proportionally to the load, as the top elongates. Conversely, if someone pushes upwards on the free end of the beam (e.g., as shown in FIG. 3), the strain along the top of the beam decreases proportionally to the load, as the top compresses.

Fiber optic strain sensing can be accomplished by etching a repeating pattern (the fiber bragg grating) over a small section of the optical fiber. The distortion in the fiber medium due to this grating results in a predictable response pattern or frequency from the interrogation method. When the fiber experiences displacement due to an applied strain, the grate pattern changes (elongates or compresses, depending on the applied load) which proportionally changes the interrogation response. Based on the response change, the applied strain can be calculated very accurately, often to less than 1 μstrain.

There are two popular interrogation methods for fiber optic sensors. Broadband optical spectroscopy, and tuned swept laser. Embodiments utilizing such fiber optic sensors can utilize either interrogation method, or any other suitable interrogation method, for measuring strain from a fiber-bragg grating. An example response from broadband light interrogation is shown in FIG. 2.

Traditional foil based strain gages are notoriously fragile. Unless embedded in a hermetic enclosure, such as a load cell, strain gages are prone to delamination (due to adhesive bond failure), impact damage, and wire de-bonding. A large portion of aircraft fuel storage can be within the wings, where the wing structure itself can act as the fuel tank. Embodiments can include embedded fiber optic strain sensing cables in between the composite fiber layers. This installation method can provide long term reliability of the strain sensors, removing the potential for damage due to maintenance personnel over the life of the aircraft, as well as shielding the strain sensors from other environmental hazards.

Embodiments can measure the reaction of the vessel holding the fuel to the applied load. By embedding strain sensors in the wing structure, the structural reaction can be measured directly, for example. While there are other factors that can impact the measured strain (aircraft flight attitude, variable cargo loads within the aircraft, temperature, etc.), embodiments can provide the capability to compensate for a number of the external factors through a differential measurement. By placing strain sensors in both the upper and lower sections of the wing structure, a differential measurement can remove the common components that influence load across the entire aircraft structure. The load induced by fuel mass can be the majority (if not all) of the remaining generated strain signal between the upper and lower wing structure.

Currently, all production systems use capacitance based height level sensors. Embodiments can remove in tank sensors all together. Any other suitable uses are contemplated herein.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A fluid quantity sensor system for sensing a fluid quantity in a fluid tank, comprising:
one or more strain sensors configured to be disposed in physical communication with the tank to sense a strain on one or more portions of the tank,
wherein the one or more strain sensors include at least a first strain sensor disposed in physical communication with a first portion of the tank, and a second strain sensor disposed in physical communication with the second portion of the tank such that the first strain sensor is configured to sense a strain of the first portion of the tank and the second strain sensor is configured to sense a strain of the second portion of the tank, wherein the first strain sensor and the second strain sensor are positioned such that externally induced stress on a structure forming and/or supporting the tank can be cancelled out such that such that a strain caused by only the fluid in the tank is configured to be determined to determine a weight of the fluid in the tank.

2. The system of claim 1, wherein the first strain sensor is disposed in an opposite strain location of the second strain sensor.

3. The system of claim 1, wherein the first portion of the tank is a gravitational bottom of the tank, and a second portion of the tank is a gravitational top of the tank.

4. The system of claim 1, wherein the weight module is configured to receive strain signals from the first strain sensor and the second strain sensor and to cancel out externally induced stress on a structure forming and/or supporting the tank such that a strain caused by only the fluid in the tank can be determined to determine a weight of the fluid in the tank.

5. The system of claim 1, further comprising a weight module configured to be operatively connected to the one or more strain sensors and configured to determine a strain and/or a weight of a fluid in the tank based on received strain signals from the one or more strain sensors.

6. The system of claim 5, wherein the weight module includes weight correlation data configured to correlate the strain with the weight of the fluid.

7. The system of claim 1, wherein the one or more strain sensors are integral with a structure forming and/or supporting the tank.

8. The system of claim 7, wherein the structure forming and/or supporting the tank is a composite material formed in layers, wherein the one or more strain sensors are disposed between a plurality layers.

9. The system of claim 8, wherein the one or more strain sensors are one or more fiber Bragg grating (FBG) sensors.

10. An aircraft wing tank system, comprising:
a fuel tank; and
a fluid quantity sensor system for sensing a fuel quantity in the fuel tank, comprising
one or more strain sensors configured to be disposed in physical communication with the tank to sense a strain on one or more portions of the tank, wherein the one or more strain sensors include at least a first strain sensor disposed in physical communication with a first portion of the tank, and a second strain sensor disposed in physical communication with the second portion of the tank such that the first strain sensor is configured to sense a strain of the first portion of the tank and the second strain sensor is configured to sense a strain of the second portion of the tank, wherein the first strain sensor and the second strain sensor are positioned such that externally induced stress on a structure forming and/or supporting the tank can be cancelled out such that such that a strain caused by only the fluid in the tank is configured to be determined to determine a weight of the fluid in the tank.

11. The system of claim 10, wherein the first strain sensor is disposed in an opposite strain location of the second strain sensor.

12. The system of claim 10, wherein the first portion of the tank is a gravitational bottom of the tank, and a second portion of the tank is a gravitational top of the tank, wherein the weight module is configured to receive strain signals from the first strain sensor and the second strain sensor and to cancel out externally induced stress on a structure forming and/or supporting the tank such that a strain caused by only the fluid in the tank can be determined to determine a weight of the fluid in the tank.

13. The system of claim 10, further comprising a weight module configured to be operatively connected to the one or more strain sensors and configured to determine a strain and/or a weight of the fuel based on received strain signals from the one or more strain sensors.

14. The system of claim 13, wherein the weight module includes weight correlation data configured to correlate the strain with the weight of the fuel.

15. The system of claim 10, wherein the one or more strain sensors are integral with a wing structure forming and/or supporting the tank.

16. The system of claim 15, wherein the wing structure forming and/or supporting the tank is a composite material formed in layers, wherein the one or more strain sensors are disposed between a plurality layers.

17. The system of claim 16, wherein the one or more strain sensors are one or more fiber Bragg grating (FBG) sensors.

18. A method of determining a weight of a fluid in a tank, comprising:
receiving a first optical signal from a first strain sensor disposed at a first location of the tank;
receiving a second optical signal from a second strain sensor disposed at a second location of the tank;
cancelling out externally induced strain on the tank using both the first and second strain signals; and
determining the weight of the fluid in the tank based on the a remaining strain on the tank determined from the first optical signal and/or the second optical signal.

* * * * *